(12) United States Patent
Carnell et al.

(10) Patent No.: US 9,017,642 B2
(45) Date of Patent: Apr. 28, 2015

(54) OXYGEN REMOVAL

(75) Inventors: Peter John Herbert Carnell, Cleveland (GB); Martin Fowles, North Yorkshire (GB); Raymond Anthony Hadden, County Durham (GB); Suzanne Rose Ellis, Berkshire (GB)

(73) Assignee: Johnson Matthey PLC, London (GB)

( * ) Notice: Subject to any disclaimer, the term of this patent is extended or adjusted under 35 U.S.C. 154(b) by 1865 days.

(21) Appl. No.: 12/293,175

(22) PCT Filed: Mar. 5, 2007

(86) PCT No.: PCT/GB2007/050100
§ 371 (c)(1),
(2), (4) Date: Feb. 11, 2009

(87) PCT Pub. No.: WO2007/105012
PCT Pub. Date: Sep. 20, 2007

(65) Prior Publication Data
US 2009/0242462 A1 Oct. 1, 2009

(30) Foreign Application Priority Data
Mar. 16, 2006 (GB) .................................. 0605232.8

(51) Int. Cl.
*C01B 3/16* (2006.01)
*B01J 8/02* (2006.01)
(Continued)

(52) U.S. Cl.
CPC .... *B01J 8/02* (2013.01); *B01J 8/04* (2013.01); *B01J 8/0457* (2013.01); *B01J 2208/00203* (2013.01); *B01J 2208/00504* (2013.01); *B01J 2219/00006* (2013.01); *B01J 2219/00038* (2013.01); *B01J 2219/0004* (2013.01); *C01B 3/382* (2013.01); *C01B 3/48* (2013.01); *C01B 2203/0244* (2013.01); *C01B 2203/0261* (2013.01); *C01B 2203/0283* (2013.01);
(Continued)

(58) Field of Classification Search
USPC .......... 422/625, 626, 627, 628, 629; 423/651, 423/652, 655, 658.3
See application file for complete search history.

(56) References Cited

U.S. PATENT DOCUMENTS 2,384,065 A  4/1945  Balcar
4,181,503 A *  1/1980  Lesieur et al. ............... 48/127.7
(Continued)

FOREIGN PATENT DOCUMENTS

EP  0 145 262 B1  6/1985
EP  0 234 771 B1  9/1987
(Continued)

OTHER PUBLICATIONS

P. G. Gray et al., "Adventures with HotSpot™ Fuel Processing, Efficient Hydrogen Production for Use with Solid Polymer Fuel Cells," *Platinum Metals Rev.*, 2000, vol. 44, Issue 3, Jul. 2000, pp. 108-111.

*Primary Examiner* — Randy Boyer
(74) *Attorney, Agent, or Firm* — RatnerPrestia

(57) ABSTRACT

A process for reducing free oxygen in a hydrocarbon gas stream comprises the steps of
(i) forming a gas mixture containing hydrogen from a hydrocarbon,
(ii) mixing the hydrogen gas mixture with a gaseous hydrocarbon stream containing free oxygen, and
(iii) passing the resulting hydrocarbon gas mixture over a conversion catalyst that converts at least a portion of the free oxygen present in the gaseous hydrocarbon to steam.

20 Claims, 2 Drawing Sheets

(51) Int. Cl.
*B01J 8/04* (2006.01)
*C01B 3/38* (2006.01)
*C01B 3/48* (2006.01)

(52) U.S. Cl.
CPC ... *C01B2203/1241* (2013.01); *C01B 2203/127* (2013.01); *C01B 2203/1276* (2013.01); *C01B 2203/142* (2013.01)

(56) References Cited

U.S. PATENT DOCUMENTS

| | | | |
|---|---|---|---|
| 4,579,723 A | | 4/1986 | Weltmer et al. |
| 4,755,498 A | * | 7/1988 | Setzer et al. ................ 502/303 |
| 4,940,826 A | * | 7/1990 | Font Freide et al. .......... 585/600 |
| 5,006,133 A | | 4/1991 | Mandrin et al. |
| 5,446,232 A | | 8/1995 | Chen et al. |
| 5,728,354 A | | 3/1998 | Domergue et al. |
| 6,280,864 B1 | * | 8/2001 | Towler et al. ................. 429/412 |
| 6,623,720 B2 | * | 9/2003 | Thompson et al. ........... 423/656 |
| 2002/0007595 A1 | | 1/2002 | Maier-Roeltgen et al. |
| 2004/0159584 A1 | | 8/2004 | Liu et al. |

FOREIGN PATENT DOCUMENTS

| | | |
|---|---|---|
| EP | 0 243 052 B1 | 10/1987 |
| EP | 0 262 947 B1 | 4/1988 |
| EP | 0 480 603 B1 | 4/1992 |
| EP | 0 516 401 A1 | 12/1992 |
| GB | 844971 | 8/1960 |
| GB | 944207 | 12/1963 |
| GB | 2 127 711 A | 4/1984 |
| WO | WO-99/48805 A1 | 9/1999 |
| WO | WO-00/66487 A1 | 11/2000 |
| WO | WO 2004/033598 A1 * | 4/2004 |
| WO | WO 2004033598 A1 * | 4/2004 |
| WO | WO-2004/069753 A1 | 8/2004 |

* cited by examiner

OXYGEN REMOVAL

CROSS-REFERENCE TO RELATED APPLICATIONS

This application is the U.S. National Phase application of PCT International Application No. PCT/GB2007/050100, filed Mar. 5, 2007, and claims priority of British Patent Application No. 0605232.8, filed Mar. 16, 2006, both of which are incorporated herein by reference.

FIELD OF THE INVENTION

This invention relates to a process for removing free oxygen from gaseous hydrocarbons.

BACKGROUND OF THE INVENTION

Gaseous hydrocarbons such as natural gas, LPG or LNG may contain small amounts of free oxygen, i.e. $O_2$ gas. Free oxygen may be introduced inadvertently, by use of a gaseous hydrocarbon as a stripper gas or by blending with air. For example, natural gas may contain free oxygen as a result of poor purging after maintenance, air leakage into stripper pumps, use of natural gas as stripper gas for gas dryers, use of natural gas as stripper gas for water injection and from dissolved air in fluids injected down hole. The amount of free oxygen in the natural gas recovered from these processes may be in the range 70 to 100 ppm (vol). Alternatively, free oxygen may be introduced into LPG or LNG by blending processes with air to reduce calorific value in so-called "air balancing". The amount of free oxygen introduced into LPG or LNG in this way may be as much as 0.5% vol.

The presence of free oxygen is potentially hazardous although the main concern in processing gaseous hydrocarbons containing free oxygen is corrosion to process equipment, resulting in costly replacement and maintenance. It is therefore desirable to limit free oxygen content to a few ppm or less.

Direct combustion of the free oxygen by heating the gaseous hydrocarbon over a combustion catalyst requires temperatures of 300° C. or more and it is not practical to heat large volumes of gas to this temperature and then cool it for subsequent use.

We have devised a process that overcomes these problems.

SUMMARY OF THE INVENTION

Accordingly the invention provides a process for reducing free oxygen in a gaseous hydrocarbon stream, comprising the steps of
(i) forming a gas mixture containing hydrogen from a hydrocarbon,
(ii) mixing the gas mixture with a gaseous hydrocarbon stream containing free oxygen, and
(iii) passing the resulting hydrocarbon gas mixture over a conversion catalyst that converts at least a portion of the free oxygen present in the gaseous hydrocarbon to steam.

BRIEF DESCRIPTION OF THE DRAWINGS

The invention is further illustrated by reference to the drawings in which.

Figure 1:
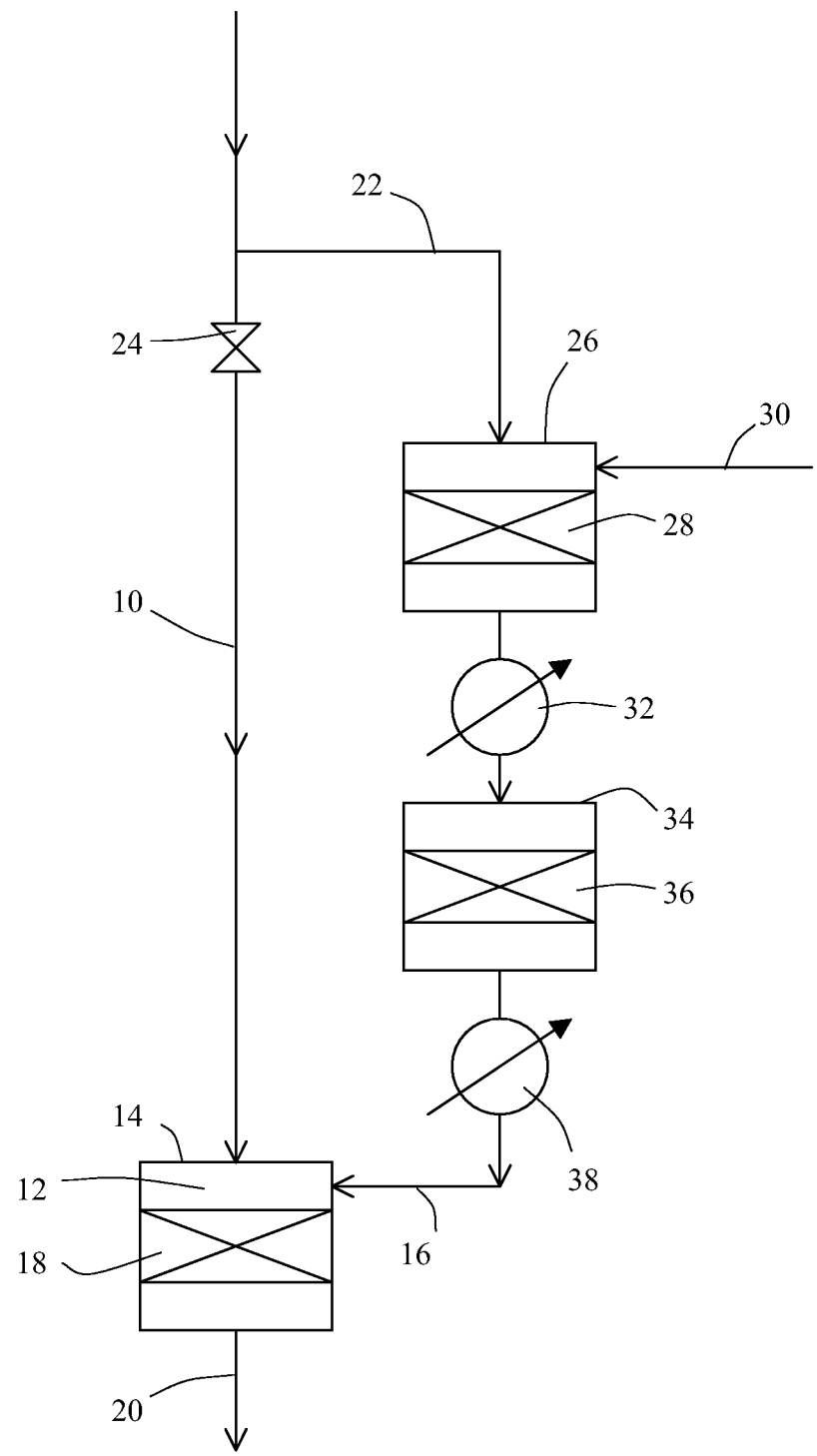
FIG. 1 is a flowsheet of one embodiment of the process of the present invention and FIG. 2 is a flowsheet of an alternative embodiment wherein the hydrogen generation and shift reactions take place within the same vessel.

The hydrogen-containing gas mixture may be formed by catalytic dehydrogenation (cDH) of C2+ alkanes over oxidic or precious metal catalysts. By "C2+ alkanes" we mean alkanes of formula $C_nH_{2n+2}$ having n≥2, preferably one or more of ethane, propane, butane, pentane and hexane. The main types of alkane dehydrogenation catalysts are Group 8 metals, particularly platinum/tin supported on $ZnAl_2O_4$, $MgAl_2O_4$ or alumina, chromium oxides on alumina or zirconia and gallium either as a supported oxide or present in zeolites. Light paraffins are best dehydrogenated using promoted Pt/Sn on alumina and $Cr_2O_3$ on alumina above 500° C., preferably above 600° C. Long chain paraffins are best dehydrogenated using promoted Pt/Sn on alumina at temperatures between 400-500° C. While effective for forming hydrogen from hydrocarbons, in order to maintain activity, a periodical regeneration of the catalyst with air may be necessary to burn off carbon deposits (coke).

The hydrogen containing gas mixture may comprise one or more gases that are inert over the conversion catalyst, such as nitrogen or may comprise a gas that is reactive over the catalyst, i.e. one that may be reacted with the free oxygen and thereby remove it from the hydrocarbon stream. Preferably the hydrogen-containing gas further comprises carbon monoxide.

For example, a hydrogen- and carbon monoxide-containing gas mixture may be formed by partial combustion of a hydrocarbon. Partial combustion of a hydrocarbon with an oxygen-containing gas, such as air, oxygen or oxygen-enriched air produces a gas mixture containing hydrogen and carbon monoxide as well as other gases such as unreacted C2+ hydrocarbons, methane, carbon dioxide and nitrogen. Partial combustion, also termed partial oxidation, maybe carried out using any known partial oxidation process. Partial combustion of a hydrocarbon may be performed by flame combustion in a burner using an oxygen-containing gas in the absence of a combustion catalyst, by so-called non-catalytic partial oxidation (POx), or preferably may be performed at lower temperatures in the presence of a partial oxidation catalyst by so-called catalytic partial oxidation (cPOx). In cPOx, the catalyst is preferably a supported Rh, Ni, Pd or Pt catalyst having <20% wt metal or alloy combinations of these metals, on an inert support such as silica, alumina, titania or zirconia.

Alternatively, a hydrogen- and carbon monoxide-containing gas mixture may be formed by autothermal reforming (ATR) comprising oxidising a hydrocarbon, usually a gaseous hydrocarbon, with an oxygen containing gas in the presence of steam and steam reforming the resulting gas mixture containing unreacted hydrocarbon over a steam reforming catalyst to produce a gas mixture containing hydrogen and carbon oxides (carbon monoxide and carbon dioxide). In autothermal reforming therefore steam is added with the hydrocarbon and/or oxygen-containing gas. The oxidation step, which may be performed catalytically, is exothermic and generates the heat required by the endothermic steam reforming reactions. Precious metal oxidation catalysts are preferred. Catalysts used in reforming the hydrocarbon may include one or more of Ni, Pt, Pd, Ru, Rh and Ir supported at levels up to 10% wt on oxidic supports such as silica, alumina, titania, zirconia, ceria, magnesia or other suitable refractory oxides, which may be in the form of pellets, extrudates, cellular ceramic and/or metallic monolith (honeycomb) or ceramic foam or other support structures offering mechanical strength and low pressure drop. In a preferred embodiment, the oxidation and steam reforming reactions are catalysed, more preferably over the same catalyst composition so that one catalyst provides both functions. Such catalysts are described in WO 99/48805 and include Rh or Pt/Rh on a refractory supports comprising Ce and/or Ce/Zr-containing mixtures. The process may be operated at inlet temperatures in the range 250-550° C. and outlet temperatures in the range 600-800° C. depending on the amount of preheat and $O_2$:$H_2O$ ratio, and pressures of up to typically about 3 bar abs.

As well as combustion and steam reforming reactions, the water-gas-shift reaction takes place over the reforming catalyst. Thus the reactions taking place in an autothermal reformer, where the hydrocarbon comprises methane include;

$$CH_4 + 2O_2 \rightarrow CO_2 + 2H_2O$$

$$CH_4 + H_2O \rightarrow CO + 3H_2$$

$$CO + H_2O \rightarrow CO_2 + H_2$$

However, autothermal reforming requires a supply of water for steam generation, which may not be practical in e.g. offshore installations. In such cases, hydrogen formation by cDH, POx or cPOx may be preferred. Alternatively, a water recycle system whereby unreacted steam is condensed from the hydrogen-containing gas and recycled to the reforming step may be employed.

Whereas a hydrogen- and carbon monoxide-containing gas mixture may be formed by steam reforming alone, this is not preferred.

If desired, the reformed gas mixture containing hydrogen, steam and carbon oxides (CO and $CO_2$) may be cooled and passed over a water-gas-shift catalyst that reacts carbon monoxide with steam to increase the hydrogen content of the gas mixture according to the following equation.

$$CO + H_2O \leftarrow H_2 + CO_2$$

The water-gas shift catalyst may be precious metal-based, iron-based or copper-based. For example a particulate copper-zinc alumina low-temperature shift catalyst containing 25-35% wt CuO, 30-60% wt ZnO and 5-40% Al2O 3% may be used at temperatures in the range 200-250° C. Alternatively the water gas-shift catalyst may be Pt on ceria or titania. Where it is desired to use a carbon monoxide-containing gas over the conversion catalyst the water-gas shift step may be omitted.

Whether hydrogen formation is by ATR, POx or cPOx, with or without the water-gas shift reaction, it may be desirable to cool the resulting gas mixture before contacting it with the hydrocarbon containing free oxygen. Preferably the temperature of the gas mixture is ≤300° C., more preferably ≤200° C., more preferably ≤150° C. when it is combined with the hydrocarbon containing free oxygen. Cooling of the gas mixture may be effected using known heat exchanger technology. For example the gas mixture may be cooled using water under pressure in high and medium pressure steam generation.

The hydrogen-containing gas formed from the hydrocarbon is combined with the hydrocarbon containing free oxygen and the resulting gas mixture passed over the conversion catalyst in order to react the hydrogen with the free oxygen to produce steam. Alternatively or additionally, the conversion catalyst may convert the free oxygen into carbon dioxide by reaction with any carbon monoxide present in the mixed gas stream. These reactions may proceed according to the following equations;

$$\tfrac{1}{2}O_2 + H_2 \rightarrow H_2O$$

$$\tfrac{1}{2}O_2 + CO \rightarrow CO_2$$

The conversion catalyst may be any shown to display activity for the oxidation of hydrogen and/or carbon monoxide at low temperatures, and preferably is a supported Group 8 transition metal catalyst. For example the catalyst may comprise one or more of Co, Ni, Pt, Pd, Rh, Ir or Ru on an oxidic support such as ceria, magnesia, alumina, titania, zirconia or silica. Au may also be present. Metal sulphide supports may also be used. Preferably the catalyst comprises Au, PtSn, PtFe, PtCo, Pt, Pd, Co or Ni on alumina, e.g. ≤5% wt Pt on alumina. The conversion catalyst may be in the form of a woven, nonwoven or knitted mesh, particulates such as pellets or extrudates, a foam, monolith or coating on an inert support. The conversion of the free oxygen is preferably performed at ≤300° C., more preferably ≤200° C., most preferably ≤150° C., with an inlet gas temperature preferably <100° C., more preferably <50° C.

The hydrocarbon used to form the gas mixture containing hydrogen may be obtained from a variety of sources, e.g. natural gas or crude oil refinery operations. Preferably however, the hydrocarbon used as the source of hydrogen is a portion of the gaseous hydrocarbon containing free oxygen. Thus in a preferred process, a side stream portion of gaseous hydrocarbon containing free oxygen is withdrawn, from e.g. a pipeline, used to form the hydrogen-containing gas mixture by ATR, cDH, POx or cPOx and this mixture, optionally following a step of water-gas-shift, combined with the remainder of the hydrocarbon containing free oxygen. The flow of side-stream hydrocarbon to the hydrogen-forming means may be controlled by means of a forcing valve. The volume of side stream portion withdrawn is preferably enough to generate sufficient hydrogen and/or carbon monoxide required to reduce the free oxygen content of the hydrocarbon down to acceptable levels, e.g. to ≤5 ppm. The amount withdrawn is therefore preferably ≤20%, more preferably ≤10%, most preferably ≤5% by volume of the gaseous hydrocarbon stream. By utilising only a small portion of the hydrocarbon-containing free oxygen to generate hydrogen and carbon monoxide, the final composition of the hydrocarbon, after conversion of the free oxygen is not significantly altered and therefore may be used without further separation of the components.

In a preferred embodiment, the hydrocarbon containing free oxygen is natural gas, i.e. a methane-rich gas stream containing minor amounts of C2+ hydrocarbons. The natural gas may be a "raw" natural gas as recovered from subterranean sources, including associated gas recovered with crude oil, or may be a "process" natural gas that has been used in a process, such as a stripping gas. Natural gas liquids (NGLs) may also be used.

If desired, sulphur and optionally mercury or arsenic absorbers may be provided, e.g. upstream of the hydrogen generation step, to remove poisons from the hydrocarbon used to form the hydrogen containing gas and so protect any catalysts used therein from poisoning. Suitable sulphur absorbers include zinc oxide compositions, preferably copper-containing zinc oxide compositions whereas mercury and arsenic are usefully absorbed on metal sulphides such as copper sulphide. Particularly suitable sulphur and mercury absorbents are described in EP0243052 and EP0480603. Additionally, hydrodesulphurisation may also be performed upstream of any adsorbents, using known Ni or Co catalysts to convert organic-sulphur, -nitrogen -mercury and -arsenic compounds into more readily removable materials such as $H_2S$, $NH_3$, Hg and $AsH_3$.

Although upstream sulphur removal may be desirable to protect the downstream catalysts, in cases where a precious metal reforming catalyst is employed upstream of a water gas shift catalyst, it may be desirable in addition or as an alternative to include a sulphur absorbent between the reforming catalyst and water-gas shift catalyst.

It may also be desirable to include such a desulphurisation step upstream of the conversion catalyst.

A portion of the hydrogen-containing gas may if desired be subjected to a step of hydrogen separation e.g. using suitable membrane technology, and the recovered hydrogen sent upstream, e.g. for hydrodesulphurisation purposes.

In a particularly preferred process, a side-stream of natural gas is withdrawn and used to generate the hydrogen-containing gas mixture.

The apparatus used for the process of the present invention may be conveniently compact, in particular where side-stream partial combustion is affected.

Accordingly, the invention further provides apparatus for reducing the free oxygen content of a gaseous hydrocarbon, comprising a conversion vessel having gaseous hydrocarbon inlet means, product gas outlet means, a conversion catalyst disposed within said vessel between said inlet and outlet means and hydrogen formation means operatively connected to said conversion vessel that provide a hydrogen-containing gas to said vessel such that the gaseous hydrocarbon is mixed with said hydrogen-containing gas and passed over said catalyst.

The hydrogen formation means may comprise a catalytic dehydrogenation vessel having C2+ alkane inlet means, product gas outlet means and containing a dehydrogenation catalyst disposed between said inlet and outlet means.

Alternatively, the hydrogen formation means may comprise an autothermal reformer having hydrocarbon and steam inlet means, an oxygen-containing gas inlet means, product gas outlet means and disposed between the inlet and outlet means, a partial oxidation catalyst and steam reforming catalyst.

Preferably, the hydrogen formation means comprise a partial combustion vessel, having hydrocarbon and oxygen-containing gas inlet means, product gas outlet means and optionally containing a partial oxidation catalyst between said inlet and outlet means.

In one embodiment a water-gas-shift vessel containing a water-gas shift catalyst is operatively connected between the partial combustion vessel or autothermal reforming vessel and the conversion vessel so that the gaseous product stream from the partial combustion vessel or autothermal reforming vessel may be enriched with hydrogen before being mixed with the free-oxygen-containing gaseous hydrocarbon stream and passed over the conversion catalyst.

Suitable heat exchanger means may be provided to cool the gaseous product stream from the hydrogen forming means to prevent decomposition of the free-oxygen-containing gaseous hydrocarbon, and to prevent damage to the water-gas-shift catalyst, if present.

It is desirable that any apparatus used to generate hydrogen is compact so as to facilitate off-shore as well as on-shore installation. In particular, reforming and shift stages may be combined in compact hydrogen-generation apparatus wherein a hydrocarbon and oxygen are combined over a precious metal partial oxidation catalyst, which may also function as a catalyst for the stream reforming reactions, and the resulting reformed gas mixture cooled and passed over a suitable water-gas shift catalyst. Cooling of the reformed gas mixture may be performed using heat exchange means, such as cooling coils, plates or tubes, or by direct injection of water. Hence in a preferred embodiment, the hydrogen generation apparatus comprises a vessel in which is disposed a supported precious metal reforming catalyst and a separate supported water-gas shift catalyst with heat exchange tubes or plate between the catalysts. The hydrocarbon is fed, with an oxygen-containing gas and steam, to the reforming catalyst where oxidation and steam reforming reactions take place. The resulting reformed gas mixture containing hydrogen, carbon oxides steam and a small amount of unreacted hydrocarbon is then cooled by the heat exchange coils or plate and passed over the water-gas shift catalyst to increase the hydrogen content of the hydrogen-containing gas. The use of hydrogen generation apparatus comprising both reforming and shift catalysts is preferred in that it is very compact and may therefore readily be installed in off-shore as well as onshore facilities such as oil production platforms. We have found that reforming apparatus designed for fuel cell hydrogen generation is particularly suited to the present invention due to its relatively small size. Suitable apparatus for autothermal reforming is described in EP0262947 and Platinum Met. Rev. 2000, 44 (3), 108-111, and is known as the HotSpot™ reformer.

In FIG. 1, a natural gas containing 70-100 ppm free oxygen is fed via line 10, to a mixing zone 12 in a conversion vessel 14 where it is mixed with a hydrogen-containing gas stream fed to said vessel via line 16. The resulting gas mixture passes from the mixing zone 12 at <300° C. through a bed of particulate supported precious metal conversion catalyst 18. The level of free oxygen in product stream 20 leaving vessel 14 is reduced to <5 ppm. Upstream of the conversion vessel 14 a side-stream line 22 withdraws a portion of the oxygen-containing natural gas from line 10. The amount of natural gas withdrawn via line 22 is controlled by valve 24 located downstream of side-stream line 22 in line 10. The withdrawn portion (≤20% vol) is fed via line 22 to a partial combustion vessel 26 in which is disposed a precious metal partial oxidation catalyst 28. Air is fed via line 30 to combustion vessel 26. The oxygen in the air 30 reacts with the hydrocarbon feed over the catalyst 28 to provide a gaseous product stream comprising hydrogen, carbon monoxide, steam and carbon dioxide. The gaseous product stream emerging from combustion vessel 26 is cooled in heat exchanger 32 and then passed to water gas shift vessel 34 containing a bed of copper-based water-gas shift catalyst 36. The hydrogen content of the partially combusted gas stream is increased over the water gas shift catalyst. The hydrogen-enriched gas stream is passed from vessel 34, via heat exchanger 38 and line 16 to mixing zone 12 where it is mixed with the major part of the free oxygen-containing natural gas.

Figure 2:
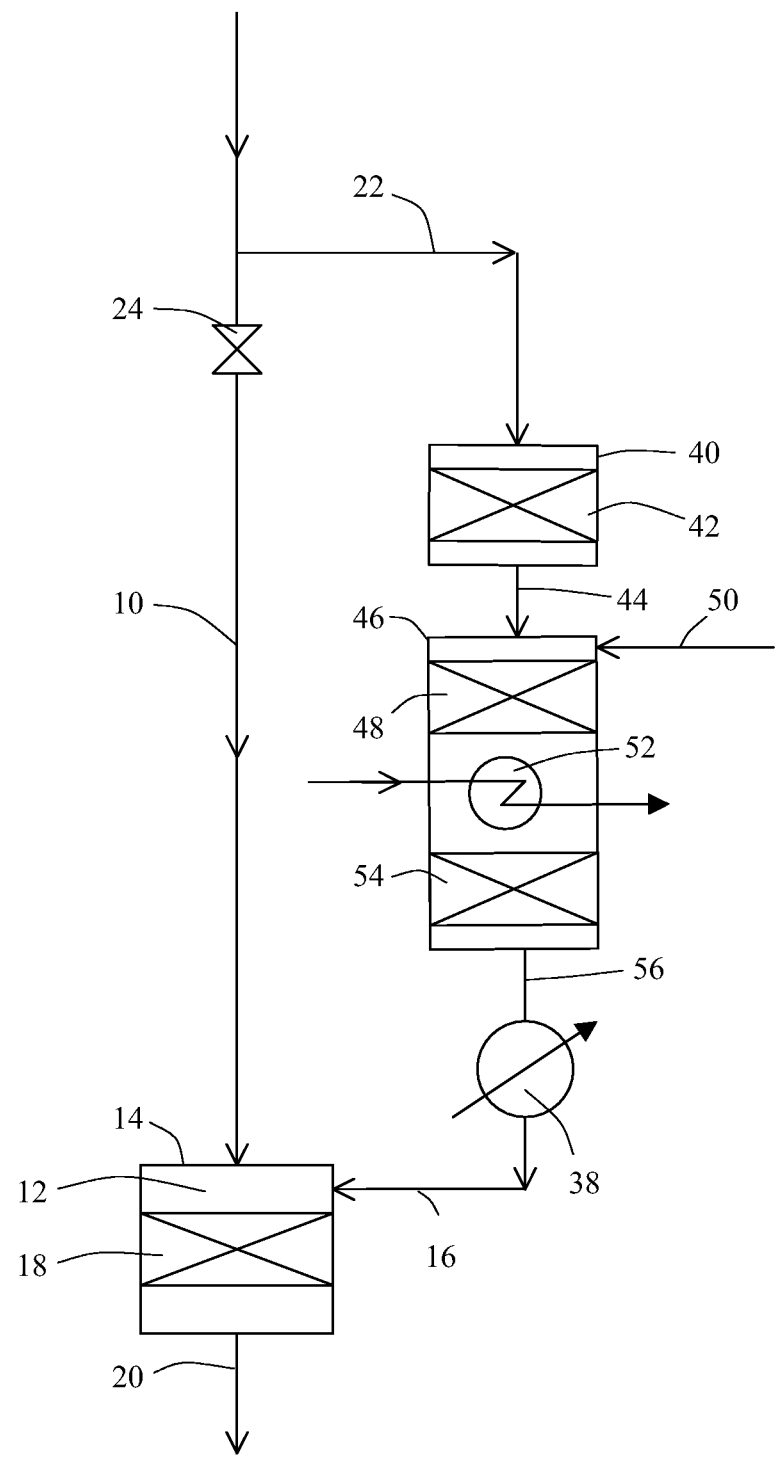

In FIG. 2 a natural gas containing 70-100 ppm free oxygen is fed via line 10, to a mixing zone 12 in a conversion vessel 14 where it is mixed with a hydrogen-containing gas stream fed to said vessel via line 16. The resulting gas mixture passes from the mixing zone 12 at <300° C. through a bed of particulate supported precious metal conversion catalyst 18. The level of free oxygen in product stream 20 leaving vessel 14 is reduced to <5 ppm. Upstream of the conversion vessel 14 a side-stream line 22 withdraws a portion of the oxygen-containing natural gas from line 10. The amount of natural gas withdrawn via line 22 is controlled by valve 24 downstream of side-stream line 22 in line 10. The withdrawn portion (≤20% vol) is fed via line 22 to a purification vessel 40, containing a particulate copper-zinc oxide composition 42 that removes hydrogen sulphide from the gas stream. The desulphurised gas is then preheated by means of a heat exchanger (not shown) and fed via line 44 to hydrogen generation vessel 46 containing a monolithic Rh on Ceria-doped zirconia reforming catalyst 48. The desulphurised gas is mixed with oxygen and steam fed to the hydrogen generation vessel 46 via line 50 and the mixture autothermally reformed (oxidised and steam reformed) over the catalyst 48. The catalyst catalyses both the combustion and steam reforming reactions. The reformed gas stream comprising hydrogen, steam and carbon oxides, is cooled by means of heat exchange tubes 52 within the vessel 46 downstream of the reforming catalyst 48. The cooled gases then pass to a bed of low-temperature shift catalyst 54 disposed within vessel 46 downstream of said heat exchange tubes 52. The cooled gas mixture reacts over the catalyst 54 to increase the hydrogen content of the gas mixture by the water-gas shift reaction. The gas mixture then passes from the hydrogen generation vessel 46 via line 56 to a heat exchanger 38 where it is cooled.

The cooled gas stream containing hydrogen is then passed from heat exchanger 38 via line 16 to the mixing zone 12 where it is mixed with the major part of the free oxygen-containing natural gas.

The invention claimed is:

1. A process for reducing free oxygen in a gaseous hydrocarbon stream, comprising the steps of
    (i) forming a gas mixture containing hydrogen from a hydrocarbon,
    (ii) mixing the gas mixture with a gaseous hydrocarbon stream containing free oxygen, and
    (iii) passing the resulting hydrocarbon gas mixture over a supported Group 8 transition metal conversion catalyst that converts at least a portion of the free oxygen present in the gaseous hydrocarbon to steam,
    wherein the hydrogen-containing gas mixture is formed from a side stream portion of the hydrocarbon containing free oxygen and the side stream portion is ≤20% by volume of the gaseous hydrocarbon stream.

2. A process according to claim 1 wherein the hydrogen-containing gas mixture is formed in a step of catalytic dehydrogenation of C2+ alkanes over oxidic or precious metal catalysts.

3. A process according to claim 1 wherein the hydrogen-containing gas mixture is formed by autothermal reforming comprising a step of partial oxidation of a hydrocarbon/steam mixture with an oxygen containing gas, optionally over an oxidation catalyst, followed by passing the partially oxidised gas mixture directly over a supported Ni or precious metal steam reforming catalyst.

4. A process according to claim 3 wherein the oxidation and steam reforming catalysts are both a supported precious metal catalyst.

5. A process according to claim 1 wherein the hydrogen containing gas mixture is formed by partially oxidising a hydrocarbon with an oxygen containing gas.

6. A process according to claim 5 wherein the partial oxidation of the hydrocarbon is performed in the absence of a partial oxidation catalyst.

7. A process according to claim 5 wherein the partial oxidation of the hydrocarbon is performed in the presence of a partial oxidation catalyst.

8. A process according to claim 7 wherein the partial oxidation catalyst is a supported precious metal oxidation catalyst.

9. A process according to claim 3 wherein the hydrogen-containing gas mixture is subjected to a water gas shift reaction over a water-gas-shift catalyst to increase the hydrogen content of the gas mixture.

10. A process according to claim 1 wherein the hydrocarbon containing free oxygen is natural gas.

11. A process according to claim 1 wherein the conversion of free oxygen is carried out at a temperature ≤300° C.

12. A process according to claim 1 wherein sulphur and optionally mercury or arsenic absorbers are provided upstream of the hydrogen formation step to remove poisons from the hydrocarbon used to form the hydrogen-containing gas.

13. A process according to claim 1 wherein a sulphur absorber is provided upstream of the conversion catalyst.

14. A process according to claim 9 wherein a sulphur absorber is provided upstream of the water-gas shift catalyst.

15. Apparatus for reducing the free oxygen content of a gaseous hydrocarbon stream, comprising a conversion vessel having free-oxygen-containing gaseous hydrocarbon inlet means, product gas outlet means, a conversion catalyst comprising a supported Group 8 transition metal disposed within said vessel between said inlet and outlet means and hydrogen formation means operatively connected to said conversion vessel that provide a hydrogen-containing gas to said vessel such that the gaseous hydrocarbon is mixed with said hydrogen-containing gas and passed over said catalyst wherein the hydrogen formation means are operatively connected to the free-oxygen-containing gaseous hydrocarbon stream in a manner adapted to feed the hydrogen formation means with a side-stream portion of the free oxygen-containing gaseous hydrocarbon in an amount such that the side stream portion is 20% by volume of the gaseous hydrocarbon stream.

16. Apparatus according to claim 15 wherein the hydrogen formation means comprise a catalytic dehydrogenation vessel having C2+ alkane inlet means, product gas outlet means and containing a dehydrogenation catalyst disposed between said inlet and outlet means.

17. Apparatus according to claim 15 wherein the hydrogen formation means comprise an autothermal reformer having hydrocarbon inlet means, steam inlet means, an oxygen-containing gas inlet means, product gas outlet means, and disposed between the inlet and outlet means, a partial oxidation means and a steam reforming catalyst.

18. Apparatus according to claim 15 wherein the hydrogen formation means comprise a partial combustion vessel, having hydrocarbon and oxygen-containing gas inlet means, product gas outlet means and optionally containing a partial oxidation catalyst between said inlet and outlet means.

19. Apparatus according to claim 17 wherein a water-gas-shift vessel containing a water-gas shift catalyst is operatively connected between the autothermal reformer or partial combustion vessel and the conversion vessel so that the gaseous product stream from the autothermal reformer or partial combustion vessel may be enriched with hydrogen before being mixed with the free-oxygen-containing gaseous hydrocarbon stream.

20. Apparatus according to claim 15 wherein heat exchanger means are provided to cool the hydrogen-containing gas from the hydrogen formation means.

* * * * *